May 8, 1945.   J. R. ALLEN   2,375,610
AIRCRAFT CONTROL MECHANISM
Filed June 4, 1941
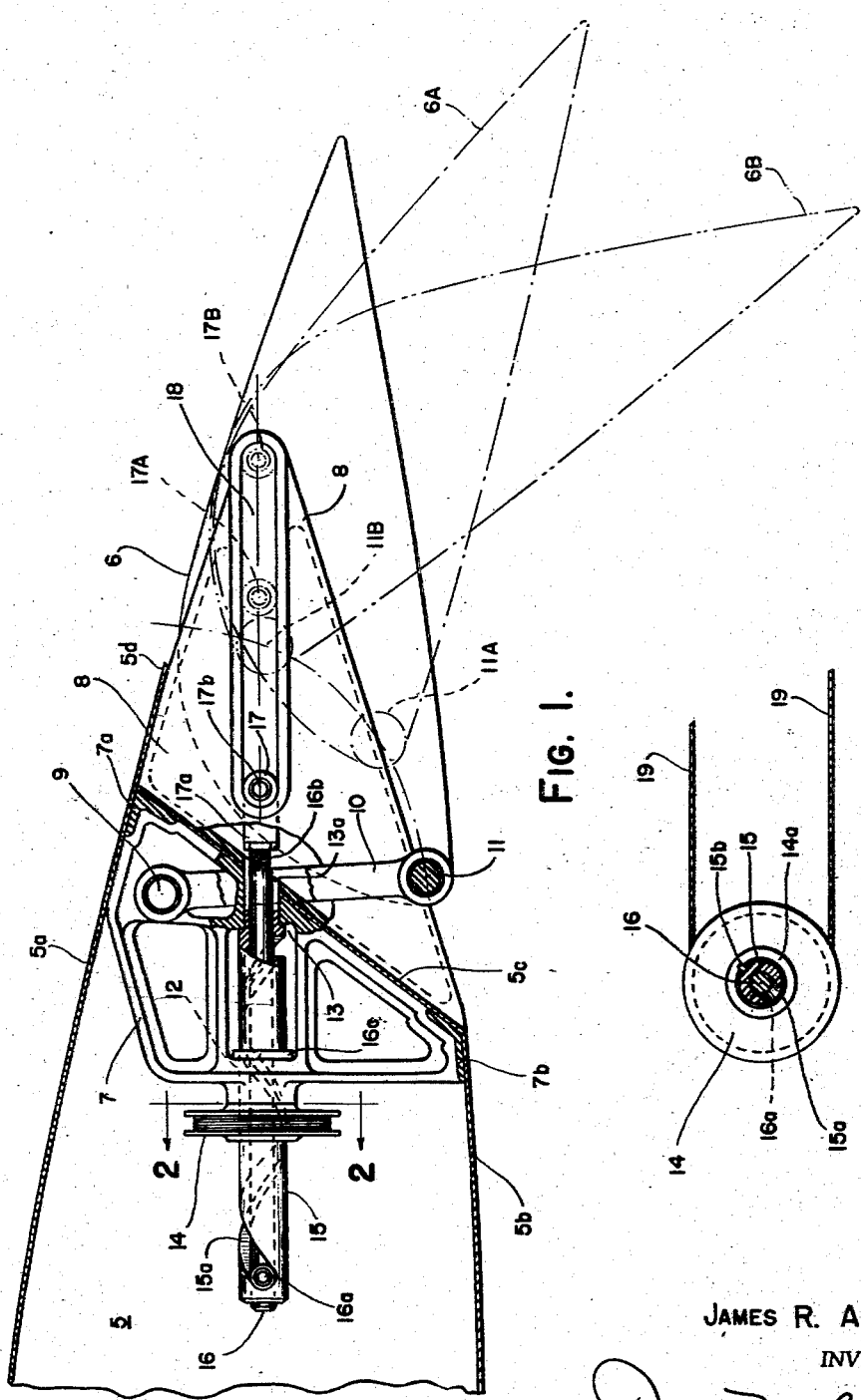
JAMES R. ALLEN.
INVENTOR.
BY James M. Clark.
HIS PATENT ATTORNEY.

Patented May 8, 1945

2,375,610

UNITED STATES PATENT OFFICE 2,375,610

AIRCRAFT CONTROL MECHANISM

James R. Allen, Los Angeles, Calif., assignor to Consolidated Vultee Aircraft Corporation, a corporation of Delaware Application June 4, 1941, Serial No. 396,514

5 Claims. (Cl. 244—42)

The present invention relates to the control and operation of movable surfaces for aircraft and more particularly to operating mechanism for the positioning of slotted ailerons and flaps at the trailing edges of aircraft wings.

In the operation of movable surfaces into positions wherein slots are formed between the trailing portion of the wing and the nose portion of the movable surface, it is usually desirable that the movable surface be either rotated, or translated bodily downwardly and rearwardly with respect to the main airfoil. Prior mechanisms have also been suggested in which both rotational and translational movements have concurrently been imparted to the movable surface. Many devices have heretofore been proposed for obtaining these movements of the movable surface, certain of these being based upon rotation of the surface about a fixed pivot frequently exposed to the airstream at a position beneath the lower surface of the wing, and other arrangements requiring complicated linkage systems which have added materially to the weight, as well as to the resistance of the wing in the normal flight position.

The present invention is directed toward a simplification of aileron and flap operating mechanisms in which the movable surface is projected both rearwardly and downwardly to create a slot of the desired width and shape, and to accomplish this by means of relatively simple and compact mechanism which is at all times housed within the profile of the wing where it offers little or no resistance to the airstream. These results are obtained in the present invention by providing spaced pivots upon the movable surface, one of which is free to swing upon a radius link suspended from the main airfoil and the other being adapted to be guided in a chordwise rectilinear path such that the movable surface is moved through an arcuate path which is substantially tangent to the wing chord line. The present invention is particularly adapted to those slotted flaps in which a fixed upper surface lip seals the slot in the neutral position of the flap and wherein the flap nose in the high-lift, high-drag position is disposed slightly forward of and below the trailing part of the slot lip which then serves to direct the airflow downwardly over the upper surface of the flap.

It is accordingly a primary object of the present invention to provide a relatively simple and compact mechanism for the operation of slot-forming surfaces such as ailerons and flaps. It is a further object of the present invention to provide such operating mechanism which is at all times contained within the cross sectional profile of the wing together with the movable surface in each of the several positions of the latter.

It is also an object of the present invention to provide means for mounting and operating a slot-forming surface comprising a radius link for causing a pivotal connection on the surface to follow an arcuate path and a second selectively movable pivot upon said surface movable along a rectilinear guide such that the surface is caused to move in an arcuate path substantially tangent to the chord line of the wing. It is a further object to provide novel operating mechanism for such surfaces consisting of a rotatable spirally slotted or threaded sleeve within which is concentrically mounted a push-pull rod capable of moving a pivotal connection on the movable surface along a chordwise rectilinear path.

Other objects and advantages of the present invention will become apparent to those skilled in the art after a reading of the following specification and the accompanying drawing forming a part hereof, in which;

Fig. 1 is a cross sectional elevation of the trailing portion of a wing to which the improved operating mechanism of the present invention has been applied showing the several positions of the trailing surface, and Fig. 2 is a sectional view of the cable operated sheave, the spirally slotted sleeve and the internally carried push-pull rod.

The main wing 5 is provided with an upper surface skin or covering 5a, a lower surface covering 5b and a plate or sheet 5c obliquely disposed in an upward and rearward direction forming the trailing portion of the main or fixed airfoil 5. A movable surface 6 is shown in full lines in its normal or high speed position supported to the rear of the trailing portion of the main airfoil such that its upper and lower surfaces are in substantial continuation of the surfaces 5a and 5b of the main wing 5. For the purpose of explaining the present invention the movable surface 6 is shown and described as a trailing edge flap of the high lift type, although the invention is not restricted entirely thereto and could be utilized for the operation of ailerons or other movable trailing edge surfaces and the necessary modification of the arrangement as shown would be obvious to those skilled in this art. In the normal or "up" position of the flap 6 it will be noted that its upper surface is in close approximation to the lip trailing part 5d of the wing upper surface 5a such that the slot is substantially closed, providing only such clearance as is normally required for its operation and having no other aerodynamic effect than is normally obtained from a fully continuous and unslotted upper surface.

Within the trailing portion of the main wing 5 there is provided a bracket 7 which has a suitable shape to fit against and be attached to the surfaces 5a, 5b and 5c of the main airfoil as well as the corner angles 7a and 7b forming the connections of these elements of the main wing. A second bracket 8 is suitably attached to the outer and rear side of the main airfoil at 5c directly to the rearward of the internal bracket. The bracket 7 is provided with a pivot 9 which projects in a spanwise direction from both sides of the bracket and from which a pair of radius links 10 is pivotally supported. The nose portion of the flap 6 is similarly provided on both sides of a rib or other chordwise bracket, with a pivot pin 11 engaging the free ends of the links 10. The bracket 7 is also provided with a chordwise bearing or journal at 12 and a second bearing 13 of somewhat lesser diameter adjacent the trailing edge sheet 5c which is suitably apertured at 13a to provide an opening the full diameter of the bearing.

The bearing 12 in the bracket 7 is of such diameter as to rotatably journal the sleeve 15 and has a forwardly facing boss against which the hub of the sheave, or cable drum 14 is adapted to rotatably bear. The hub 14a of the sheave is suitably fixed to the sleeve 15 by means of a key or feather 15b and the sleeve is further restricted from movement in an axial or chordwise direction by means of the adjustable collar 16c and the shoulder at the rear end of the sleeve adjacent its portion of reduced diameter which engages the bearing 13. The sleeve 15 is provided with a spiral or helical cam slot 15a which extends substantially co-extensive with the length of the sleeve terminating a short distance from each end and is centrally bored to permit the rod 16 to slide freely therein.

The rod 16 is provided near its forward terminal with a radially extending pin carrying a freely rotatable roller 16a which is of such diameter that rotation of the sheave 14 and the attached sleeve 15 imparts axial movements of the shaft 16 through the sleeve as a result of the cam action of the spiral slot 15a against the roller 16a which is restrained from rotating with the sleeve by means of a second roller 17 fixedly pivoted upon the terminal fitting 17a engaged by the threaded end 16b of the rod 16. The external or rear bracket 8 is provided with a chordwise extending rectilinear slot 18 which provides a suitable guide closely engaging the roller 17, preventing rotation of the rod 16. The pin 17b upon which the roller 17 is rotatably mounted is also fixedly attached to a rib or bracket portion of the flap 6 being of such length that it is also pivotally engaged by the pivot fitting 17a.

It will be understood that each flap 6 is suitably supported by at least two pivotal supports of the type shown in Fig. 1. In certain installations, however, the second actuating mechanism consisting of the sheave 14, the slotted sleeve 15, and the cable 14 might preferably be dispensed with. A suitable control cable 19 engages the drum face of the sheave 14 preferably encircling the same in a number of loops or bights in order to obtain suitable traction and positive rotation of the sheave. The cables 19 extend in a spanwise direction within the wing 5 where they are attached to suitable control means for manual operation by the pilot or actuation by automatic or other control devices.

The operation of the invention is as follows: Assuming the flap 6 to be in its normal or "flying" position as shown by the full lines in Fig. 1, should it be desired to lower the flap to an intermediate or "take-off" position such as indicated by the broken lines 6A, tension is applied to the lower run of the cable 19 causing the sheave 14 to rotate in a counter-clockwise direction as viewed in Fig. 2. This imparts like counter-clockwise direction to the sleeve 15, but as the spiral cam slot 15a is rotated with the sleeve it bears against the roller 16a pushing the same together with the attached push-pull rod 16 in a rearward direction. When the sheave 14 has been rotated somewhat less than a complete revolution the roller 16a will have been forced rearwardly approximately one-half of its full travel. The roller will then be in that portion of the cam slot 15a which is in the region of the hub 14a of the sheave through which the roller is free to pass upon continued rotation of the latter inasmuch as the pin of the roller extends from the surface of the rod 16 a distance less than the thickness of the sleeve 15, corresponding to the depth of the cam slot 15a. Rotation of the sheave and rearward movement of the pin 16a to this extent imparts rearward rectilinear movement of the rod 16 within the sleeve 15 causing the roller 17 mounted upon the flap-carried pin 17b to be moved to the position indicated by the broken lines 17A.

As the roller 17 is moved from its full line position to the broken line position 17A the rearward movement of the pin 11 carried by the flap 6 causes this pin to rotate rearwardly and upwardly in an arcuate path about the fixed pivot 9 whereupon the flap assumes the broken line position 6A. Inasmuch as the distance between the centers of the pins 11 and 17b is fixed irrespective of the position of the flap 6, rotation of the latter about the pivot 11 is restrained by the rectilinear guide slot 18 and similarly rotation of the flap about the roller 17A is restricted by the fixed length of the radius links 10 fixing the position of the pivot 11.

Continued tension applied to the lower run of the cable 19 and concurrent counter-clockwise rotation of the sheave 14 and the sleeve 15 causes further rearward movement of the roller 16a and the attached rod 16 until the roller engages the aft end of the cam slot 15a. In this position the roller 17 reaches the aft end of the guide slot 18 to occupy the broken line position 17B at which the radius links 10 have been rotated upwardly and rearwardly due to the rearward movement of the flap 6 until the pin 11 also reaches its extreme position indicated by the broken line 11B and in which the flap also reaches its extreme "down" or "landing" position shown by the dotted lines 6B. It will be noted that the spaced pivots 11 and 17b carried by the leading portion of the flap 6 are spaced in the full line position of the flap such that the links 10 are nearly vertical and the pivot 17b extends rearwardly in a chordwise direction a relatively small distance to the rear of the links 10. As the roller 17 is caused to move rearwardly and the pivot 11 rotates upwardly and rearwardly its vertical distance beneath the chordwise path of the roller 17 diminishes while the chordwise distance between these pivots increases.

In the "take-off" position 6A of the flap it will be noted that a slot of appreciable width has been formed between the leading edge of the flap and the trailing portion of the lip 5d. When the roller 17 reaches its limiting position at 17B the pivot 11 has been lifted to a position at 11B where it is but slightly below the path of the roller 17 but where the chordwise distance between the rollers 11 and 17 reaches a maximum. In this position the flap has a relatively high-lift and low-drag coefficient. In the position 6B of the flap the slot between the leading edge and the lip 5d has been maintained, being slightly less in width than at the intermediate position 6A. In the full "down" or landing position the present flap arrangement produces a relatively high-lift and high-drag coefficient making it particularly adapted for steep landings in restricted areas necessitating short landing runs. Similarly, rotation of the sheave 14 in the opposite or clockwise direction by suitable pull on the upper cable 19 will restore the flap 6 to its normal or "up" position, or to any desired intermediate position. It will be noted that the rectilinear movement of the upper rearward pivot 17b and the counterclockwise rotation of the free links 10 imparts a downward and rearward movement of the flap 6 in which its center of lift follows an arcuate path which is substantially tangent to a chordwise line joining the leading edge of the main wing 5 with the trailing edge of the flap 6.

While there has been illustrated and described a preferred form of the present invention, other modifications are also contemplated in which a single hollow or tubular lead screw would be substituted for the sleeve and rod and the sheave provided with an internal roller or threads to engage the spiral or threaded tube. In certain installations where the tube is of sufficient diameter it is also possible to dispense with the rear or external bracket. It is also contemplated that the rod 16 be a piston rod to reciprocate within a fluid-actuated hydraulic cylinder fixedly supported within the wing in place of the cable, sheave and spiral cam assembly. Other forms and modifications of the present invention, both as to its general arrangement and details, which may become obvious to those versed in the art after a reading of the foregoing specification in the light of the accompanying drawing are all intended to come within the scope and spirit of the present invention as more clearly defined by the appended claims.

I claim:

1. In a wing having a trailing edge flap, pivots on said flap spaced both vertically and chordwise with respect to each other in the normal position of the flap, actuating means for moving and guiding the upper said flap pivot rearwardly in a chordwise direction along a rectilinear path, means for concurrently moving and guiding the other said pivot in an arcuate path about a point above said rectilinear path whereby the flap is moved rearwardly and downwardly along an arcuate path substantially tangent to the wing chord lines into a slot-forming relationship with said wing.

2. In a wing flap mounting, an internal bracket supported within the wing, the said bracket provided with apertures disposed on a chordwise axis and a pivot disposed adjacent said wing upper surface in the region of its trailing edge on a spanwise axis, an external second bracket supported from the wing extending rearwardly from the trailing edge thereof having a chordwise disposed slot, spaced pivots carried by said flap disposed within the profile thereof, a first of said pivots disposed adjacent said flap lower surface in the region of its leading edge, radius link means pivotally engaging the first of said flap pivots and pivotally supported from said first bracket pivot, the other said flap pivot adapted to be moved along a rectilinear path within the guide slot of said second bracket and actuating means pivotally associated with said second flap pivot for positioning said flap into slot-forming relationship with respect to the trailing edge of said wing.

3. In a wing flap mounting, a bracket supported within the wing, the said bracket provided with apertures disposed on a chordwise axis and a pivot disposed on a spanwise axis, a second bracket supported from the wing extending rearwardly from the trailing edge thereof having a chordwise disposed slot, spaced pivots carried by said flap disposed within the profile thereof, radious link means pivotally engaging one of said flap pivots and pivotally supported from said first bracket pivot, the other said flap pivot adapted to be moved along a rectilinear path within the guide slot of said second bracket and actuating means for positioning said flap with respect to the trailing edge of said wing comprising a cable actuated sheave mounted for rotation on a chordwise axis, a member having a spiral cam slot mounted for rotation with said sheave within said bracket apertures and having a central co-axial bore, and a push-pull element slidably engaging said cam slot and pivotally connected to said flap adapted to translate rotational movement of said sheave into rectilinear movement of one of said flap pivots along said chordwise guide.

4. Actuating mechanism for the positioning of a slotted trailing edge wing flap, said flap provided with two spaced pivots disposed entirely within said flap profile, a first of said flap pivots disposed adjacent its lower surface in the region of its leading edge, a second flap pivot disposed above and rearwardly of said first flap pivot, a suspension link pivotally supported from said wing adjacent its upper surface in the region of its trailing edge having its lower portion pivotally engaging said first flap pivot, an element guided within said wing operatively engaging said second flap pivot for movement along a chordwise rectilinear path, a spirally slotted sleeve member mounted for rotation about said actuating element, means rotatably mounted upon said element slidably engaging said spiral slot, and actuating means fixed to said sleeve member adapted to impart rotary movement to said sleeve member and concurrent rectilinear movement of said element whereby the first said flap pivot is moved rearwardly and upwardly along an arcuate path, the second said flap pivot is projected rearwardly in a chordwise rectilinear path and the flap is projected rearwardly and downwardly into a plurality of slot-forming positions with respect to the trailing edge of the wing.

5. The wing flap actuating mechanism of claim 4 characterized by a substantially vertically disposed suspension link for the pivotal support of said first flap pivot whereby rearward and downward projection of the flap results in movement along a component path substantially tangent to the chord line of the wing.

JAMES R. ALLEN.